(12) United States Patent
Yang

(10) Patent No.: US 12,048,031 B2
(45) Date of Patent: Jul. 23, 2024

(54) UNICAST CONNECTION ESTABLISHMENT METHOD AND APPARATUS, AND STORAGE MEDIUM

(71) Applicant: BEIJING XIAOMI MOBILE SOFTWARE CO., LTD., Beijing (CN)

(72) Inventor: Xing Yang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 395 days.

(21) Appl. No.: 17/611,779

(22) PCT Filed: May 17, 2019

(86) PCT No.: PCT/CN2019/087424
§ 371 (c)(1),
(2) Date: Nov. 16, 2021

(87) PCT Pub. No.: WO2020/232576
PCT Pub. Date: Nov. 26, 2020

(65) Prior Publication Data
US 2022/0240328 A1 Jul. 28, 2022

(51) Int. Cl.
H04W 4/40 (2018.01)
H04W 76/11 (2018.01)
H04W 76/14 (2018.01)

(52) U.S. Cl.
CPC ............ H04W 76/11 (2018.02); H04W 76/14 (2018.02)

(58) Field of Classification Search
CPC ...... H04W 76/11; H04W 76/14; H04W 92/18
See application file for complete search history.

(56) References Cited

U.S. PATENT DOCUMENTS

| | | | | |
|---|---|---|---|---|
| 2020/0323019 A1* | 10/2020 | Vargas | ............... | H04W 76/15 |
| 2020/0344636 A1* | 10/2020 | Lee | ............... | H04W 80/02 |
| 2021/0068071 A1* | 3/2021 | Wu | ............... | H04W 4/40 |
| 2021/0259039 A1* | 8/2021 | Pan | ............... | H04W 28/0967 |
| 2022/0046751 A1* | 2/2022 | Peng | ............... | H04W 76/25 |
| 2022/0174458 A1* | 6/2022 | Peng | ............... | H04L 5/0037 |

* cited by examiner

Primary Examiner — Phuc H Tran
(74) Attorney, Agent, or Firm — Cozen O'Connor

(57) ABSTRACT

A method and an apparatus for establishing a unicast connection. The method includes: receiving a connection establishment request sent from a second terminal; acquiring a first identifier set carried in the connection establishment request, in which the first identifier set is a set of source sidelink identifiers used by the second terminal; and adding the first identifier set to a second identifier set in response to that an identifier in the first identifier set exists in the second identifier set, in which the second identifier set includes destination sidelink identifiers corresponding to the first AS unicast connection at the first terminal side, the first AS unicast connection is any connection of AS unicast connections established by the first terminal, and identifiers in an identifier set corresponding to an AS unicast connection use a same set of AS configuration parameters.

20 Claims, 4 Drawing Sheets

UNICAST CONNECTION ESTABLISHMENT METHOD AND APPARATUS, AND STORAGE MEDIUM

CROSS-REFERENCE TO RELATED APPLICATION

This application is a U.S. national phase of International Application No. PCT/CN2019/087424, filed with the State Intellectual Property Office of P. R. China on May 17, 2019, the content of which is incorporated herein by reference in its entirety.

TECHNICAL FIELD

The present disclosure relates to a field of communication technologies, and more particularly, to a method for establishing a unicast connection, an apparatus for establishing a unicast connection, and a storage medium.

BACKGROUND

Sidelink technology is a type of near field communication (NFC) technologies, which may achieve information sidelink transmission via the wireless interfaces of terminals, i.e., user equipment.

In a new radio (NR) system, a solution of performing wireless communication between terminals based on the sidelink technology via a unicast mode is proposed. In other words, in the NR system, an access stratum (AS) unicast connection can be established between terminals, and the sidelink communication may be performed based on the AS unicast connection.

SUMMARY

Embodiments of the present disclosure provide a method for establishing a unicast connection, an apparatus for establishing a unicast connection, and a storage medium. The technical solutions will be described as follows.

According to a first aspect of embodiments of the present disclosure, a method for establishing a unicast connection is provided. The method is performed by a first terminal. The method includes: receiving a connection establishment request sent from a second terminal, in which the connection establishment request is configured to request establishment of an access stratum (AS) unicast connection for transmitting a sidelink unicast service between the first terminal and the second terminal; acquiring a first identifier set carried in the connection establishment request, in which the first identifier set is a set of source sidelink identifiers used by the second terminal; and adding the first identifier set to a second identifier set in response to that an identifier in the first identifier set exists in the second identifier set, in which the second identifier set is an identifier set corresponding to a first AS unicast connection in the first terminal, the first AS unicast connection is any connection of AS unicast connections established by the first terminal, the second identifier set is a set of destination sidelink identifiers corresponding to the first AS unicast connection at the first terminal side, and identifiers in an identifier set corresponding to an AS unicast connection use a same set of AS configuration parameters.

According to a second aspect of embodiments of the present disclosure, a method for establishing a unicast connection is provided. The method is performed by a second terminal. The method includes sending a connection establishment request carrying a first identifier set to a first terminal, in which the connection establishment request is configured to request establishment of an access stratum (AS) unicast connection for transmitting a sidelink unicast service between the first terminal and the second terminal. The first identifier set is a set of source sidelink identifiers used by the second terminal.

According to a third aspect of embodiments of the present disclosure, an apparatus for establishing a unicast connection is provided. The apparatus is applicable in a first terminal. The apparatus includes a processor and a memory configured to store instructions executable by the processor. The processor is configured to: receive a connection establishment request sent from a second terminal, in which the connection establishment request is configured to request establishment of an access stratum (AS) unicast connection for transmitting a sidelink unicast service between the first terminal and the second terminal; acquire a first identifier set carried in the connection establishment request, in which the first identifier set is a set of source sidelink identifiers used by the second terminal; and add the first identifier set to a second identifier set in response to that an identifier in the first identifier set exists in the second identifier set, in which the second identifier set is an identifier set corresponding to a first AS unicast connection in the first terminal, the first AS unicast connection is any connection of AS unicast connections established by the first terminal, the second identifier set is a set of destination sidelink identifiers corresponding to the first AS unicast connection at the first terminal side, and identifiers in an identifier set corresponding to an AS unicast connection use a same set of AS configuration parameters.

According to a fourth aspect of embodiments of the present disclosure, an apparatus for establishing a unicast connection is provided. The apparatus is applicable in a second terminal. The apparatus includes a processor and a memory configured to store instructions executable by the processor. The processor is configured to: send a connection establishment request carrying a first identifier set to a first terminal, in which the connection establishment request is configured to request establishment of an access stratum (AS) unicast connection for transmitting a sidelink unicast service between the first terminal and the second terminal. The first identifier set is a set of source sidelink identifiers used by the second terminal.

According to a fifth aspect of embodiments of the present disclosure, a computer-readable storage medium is provided. The computer-readable storage medium includes executable instructions. A processor in a terminal is configured to call the executable instructions to perform the method for establishing a unicast connection according to the first aspect or any alternative implementation of the first aspect of the present disclosure.

According to a sixth aspect of embodiments of the present disclosure, a computer-readable storage medium is provided. The computer-readable storage medium includes executable instructions. A processor in a terminal is configured to call the executable instructions to perform the method for establishing a unicast connection according to the second aspect or any alternative implementation of the second aspect of the present disclosure.

It is to be understood that both the foregoing general description and the following detailed description are exemplary and explanatory only, and are not restrictive of the present disclosure, as claimed.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the present disclosure. Instead, they are merely examples of apparatuses and methods consistent with aspects related to the present disclosure as recited in the appended claims.

The network structure and business scenarios described in the embodiments of the present disclosure are used to better explain the technical solutions of the present disclosure, but not constructed to limit the technical solutions of the present disclosure. It would be appreciated by those skilled in the art that with the evolution of network structure and the emergence of new business scenarios, the technical solutions of the present disclosure may also be suitable to similar technical problems.

At present, for the unicast connection for the sidelink communication between terminals, there is a lack of a suitable solution for connection establishment.

Figure 1:
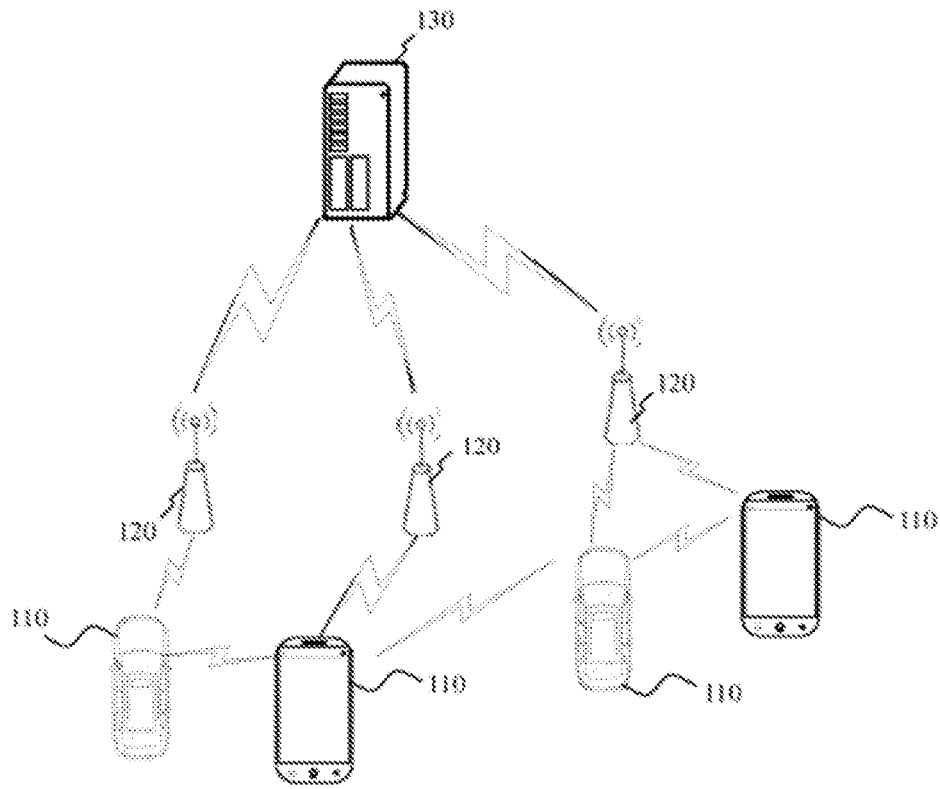
FIG. 1 is a schematic diagram illustrating a wireless communication system according to an embodiment of the present disclosure.

Refer to FIG. 1 which is a schematic diagram illustrating a wireless communication system according to an embodiment of the present disclosure. As illustrated in FIG. 1, the wireless communication system is a communication system based on a cellular mobile communication technology. The wireless communication system may include several terminals 110 and several base stations 120.

The terminal 110 may be a wireless communication device which supports various wireless access technologies to perform a sidelink transmission. For example, the terminal 110 may support the 4th generation mobile communication (4G) technology and the 5G technology. Or, the terminal 110 may support a next-generation mobile communication technology of the 5G technology.

For example, the terminal 110 may be a vehicle-mounted communication device, for example, a vehicle-mounted computer having a wireless communication function, or a wireless communication device externally connected to the vehicle-mounted computer.

Or, the terminal 110 may be a roadside device, for example, a street light, a traffic light or other roadside devices having a wireless communication function.

Or, the terminal 110 may be a user terminal, for example, a mobile phone (also called "cellular" phone) or a computer with a mobile terminal, for example, a portable, pocket-sized, handheld, built-in computer or vehicle-mounted mobile device, such as, a station (STA), a subscriber unit, a subscriber station, a mobile station, a mobile, a remote station, an access point, a remote terminal, an access terminal, a user terminal, a user agent, a user device, or a user equipment (UE). For example, the terminal 110 may be a mobile terminal such as a smart phone, a tablet computer, an e-book reader. Alternatively, the terminal 110 may be a smart wearable device, such as smart glasses, a smart watch, a smart bracelet or the like.

The base station 120 may be a network side device in the wireless communication system. The wireless communication system may also be a 5G system, also known as the new radio (NR) system. Alternatively, the wireless communication system may also be a next-generation system of the 5G system. The wireless communication system may also support the 4th generation mobile communication technology, also known as the long term evolution (LTE) technology.

The base station 120 may be a base station (gNB) adopting a centralized and distributed architecture in the 5G system. When the base station 120 adopts the centralized distributed architecture, it generally includes a central unit (CU) and at least two distributed units (DUs). The CU is provided with a protocol stack including a packet data convergence protocol (PDCP) layer, a radio link control (RLC) layer, and a media access control (MAC) layer. The DU is provided with a protocol stack including a physical (PHY) layer, and the embodiment of the disclosure does not limit the specific implementation manner of the base station 120.

A wireless connection can be established between the base station 120 and the terminal 110 through a wireless air interface. In different embodiments, the wireless air interface is a wireless air interface based on the 4G standard. Alternatively, the wireless air interface is a wireless air interface based on the 5G standard. For example, the wireless air interface is the NR. Alternatively, the wireless air interface can also be a wireless air interface based on a standard of next generation mobile communication network technology based on the 5G.

Alternatively, the wireless communication system may further include a network management device 130.

Server base stations 120 are connected to the network management device 130 respectively. The network management device 130 may be a core network device in the wireless communication system. For example, the network management device 130 may be a mobility management entity (MME) of an evolved packet core (EPC) network. Alternatively, the network management device may also be another core network device, such as a serving gateway (SGW), a public data network gateway (PGW), and a policy and charging rules function (PCRF) unit or a home subscriber server (HSS). The implementation form of the network management device 130 is not limited in the embodiments of the disclosure.

Figure 2:
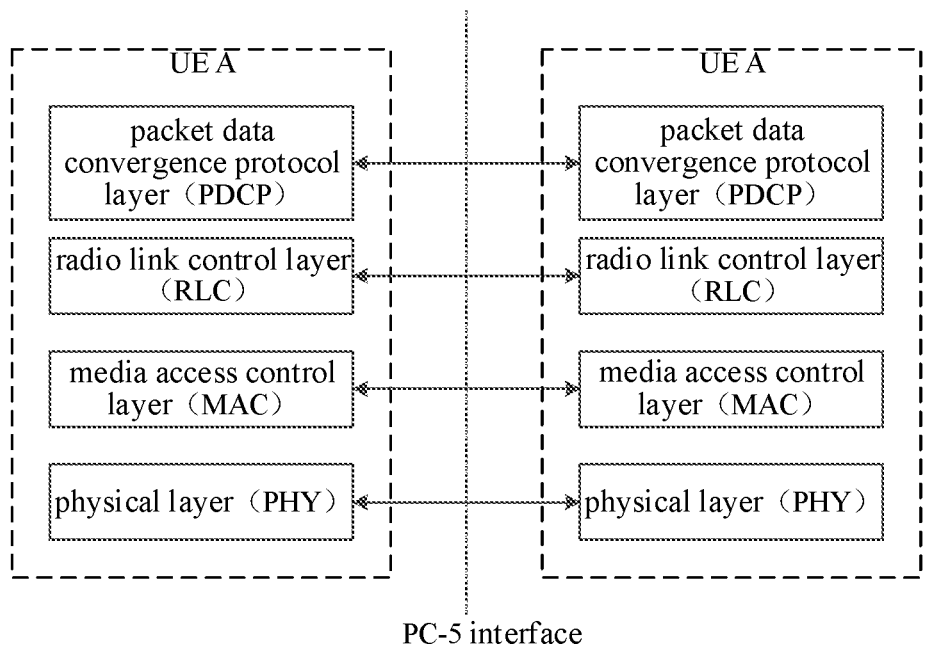
FIG. 2 is a schematic diagram illustrating a protocol stack in the sidelink communication according to an embodiment of the present disclosure.

In the 4G system, in order to support a direct communication between UEs, a sidelink communication is introduced. Refer to FIG. 2, which is a schematic diagram illustrating a protocol stack in the sidelink communication according to an embodiment of the present disclosure. As illustrated in FIG. 2, an interface between UE A and UE B is a PC-5 interface. Addressing in the sidelink transmission is achieved via a source identifier and a destination identifier of the MAC layer, without establishing a connection between the transmission.

Figure 3:
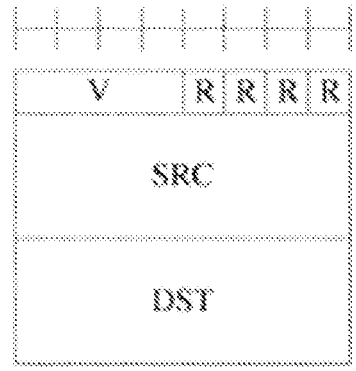
FIG. 3 is a schematic diagram illustrating a structure of a media access control (MAC) subhead in a sidelink transmission according to an embodiment of the present disclosure.

Refer to FIG. 3, which is a schematic diagram illustrating a structure of a media access control (MAC) subhead in a sidelink transmission according to an embodiment of the present disclosure. As illustrated in FIG. 3, in the MAC subhead in the sidelink transmission, SRC represents a layer-2 identifier of a source UE, while DST represents a layer-2 identifier of a destination UE. The layer-2 identifier is generated by an application layer and provided to the AS layer for use, which is configured to identify one sidelink UE. The layer-2 identifier may be called to sidelink identifier.

In the 5G system, in order to support an enhanced vehicle to everything (V2X) business, such as an enhanced vehicle to vehicle (V2V) business, an enhanced vehicle to infrastructure (V2I) business, and an enhanced vehicle to pedestrian (V2P) business, higher transmission rate and higher reliability are required, thus a unicast connection needs to established on the sidelink. For example, when the application layer receives a unicast service requirement, the corresponding source sidelink identifier and destination sidelink identifier are sent to the AS layer to trigger the AS layer to initiate a process of establishing an AS unicast connection.

For transmission of unicast data, a transmitting UE and a receiving UE need to negotiate AS configuration parameters including UE capability, PDCP SN length, modulation mode, transmitting timing and receiving timing and the like related to the unicast connection during establishment of the AS unicast connection. One UE may support multiple unicast services, and different unicast services may assign different sidelink identifiers to the UE. If a pair of UEs have established the AS unicast connection, since a new service may assign a distinct sidelink identifier to the UE, the pair of UEs may repeatedly negotiate the AS configuration parameters of the unicast connection, which may lead to additional signaling overhead.

In the technical solution of the present disclosure, a method for establishing an AS unicast connection for the sidelink communication is proposed, with which the UEs need not to negotiate the AS configuration parameters of the unicast connection again for the new service in a case that the AS unicast connection has been established between the UEs, such that an effect of saving signaling overhead between UEs via the sidelink communications can be achieved.

Figure 4:
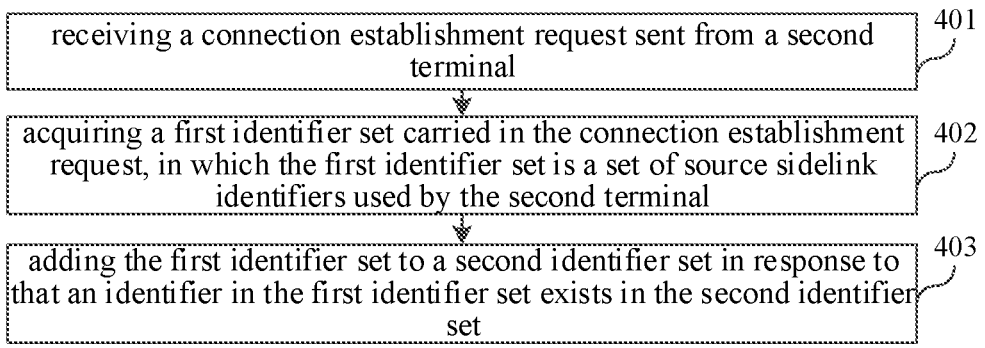
FIG. 4 is a flowchart of a method for establishing a unicast connection performed by a first terminal, according to an embodiment.

Refer to FIG. 4, which is a flowchart of a method for establishing a unicast connection according to an embodiment. The method may be applied to the wireless communication system shown in FIG. 1, and performed by a first terminal in the wireless communication system. The first terminal may be one of the terminals 110 in the wireless communication system shown in FIG. 1. As illustrated in FIG. 4, the method may include the following.

In 401, a connection establishment request sent from a second terminal is received. The connection establishment request is configured to request establishment of an AS unicast connection for transmitting a sidelink unicast service between the first terminal and the second terminal.

In 402, a first identifier set carried in the connection establishment request is acquired. The first identifier set is a set of source sidelink identifiers used by the second terminal.

In 403, in response to that an identifier in the first identifier set exists in a second identifier set, the first identifier set is added to the second identifier set.

The second identifier set is an identifier set corresponding to a first AS unicast connection in the first terminal, the first AS unicast connection is any connection of AS unicast connections established by the first terminal, the second identifier set is a set of destination sidelink identifiers corresponding to the first AS unicast connection at the first terminal side, and identifiers in an identifier set corresponding to an AS unicast connection use a same set of AS configuration parameters.

Alternatively, the method further includes establishing a second AS unicast connection with the second terminal in response to that no identifier of the first identifier set exists in identifier sets corresponding respectively to the AS unicast connections in the first terminal; and negotiating, by the first terminal and the second terminal, AS configuration parameters of the second AS unicast connection.

Alternatively, the method further includes establishing an identifier set corresponding to the second AS uncast connection in the first terminal; and adding the first identifier set to the identifier set corresponding to the second AS uncast connection in the first terminal.

Alternatively, the method further includes sending a third identifier set to the second terminal, in which the third identifier set is a set of source sidelink identifiers used by the first terminal.

Alternatively, sending the third identifier set to the second terminal includes: sending a reply message to the second terminal in response to the connection establishment request, in which the reply message carries the third identifier set.

Alternatively, the method further includes deleting the second identifier set and AS configuration parameters corresponding to the second identifier set in response to interruption of the first AS unicast connection.

Alternatively, the method further includes deleting a destination sidelink identifier corresponding to a target sidelink unicast service at the first terminal side from the second identifier set in response to completion of the target sidelink unicast service; in which the target sidelink unicast service is any service of sidelink unicast services corresponding to the first AS uncast connection.

In conclusion, according to the technical solution provided in the embodiment of the present disclosure, the terminal may configure a set of destination sidelink identifiers for each established AS unicast connection and the destination sidelink identifiers in the set share a same set of AS configuration parameters. After the first terminal receives a request for establishing an AS unicast connection sent from the second terminal, the first terminal determines whether source sidelink identifiers used by the second terminal include a sidelink identifier existing in any set of destination sidelink identifiers stored locally, if yes, it indicates that the first terminal has established the AS unicast connection with the second terminal. In this case, the source sidelink identifiers used by the second terminal may be added to the corresponding set of destination sidelink identifiers, and the AS configuration parameters of the AS unicast connection already established may be reused, without reconfiguration. At the second terminal side, the same process can be performed based on the source sidelink identifiers used by the first terminal sent from the first terminal. In this way, an effect of saving signaling overhead between UEs via the sidelink communication can be achieved.

Figure 5:
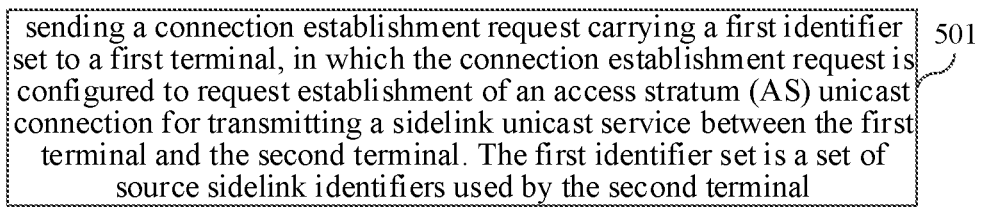
FIG. 5 is a flowchart of a method for establishing a unicast connection performed by a second terminal, according to an embodiment.

Refer to FIG. 5, which is a flowchart of a method for establishing a unicast connection according to an embodiment. The method may be applied to the wireless communication system shown in FIG. 1, and performed by a second terminal in the wireless communication system. The second terminal may be one of the terminals 110 in the wireless communication system shown in FIG. 1. As illustrated in FIG. 5, the method may include the following.

In 501, a connection establishment request carrying a first identifier set is sent to a first terminal. The connection establishment request is configured to request establishment of an AS unicast connection for transmitting a sidelink unicast service between the first terminal and the second terminal.

The first identifier set is a set of source sidelink identifiers used by the second terminal.

Alternatively, the method further includes acquiring a third identifier set, in which the third identifier set is a set of source sidelink identifiers used by the first terminal; and adding the third identifier set to a fourth identifier set in response to that an identifier in the third identifier set exists in the fourth identifier set, in which the fourth identifier set is a set of destination sidelink identifiers corresponding to a first AS unicast connection at the second terminal side, and the first AS unicast connection is any connection of AS unicast connections established by the second terminal.

Alternatively, the method further includes establishing a second AS unicast connection with the first terminal in response to that no identifier of the third identifier set exists in identifier sets corresponding respectively to the AS unicast connections in the second terminal, in which the second AS unicast connection is an AS unicast connection between the first terminal and the second terminal; and negotiating with the first terminal AS configuration parameters of the second AS unicast connection.

Alternatively, the method further includes establishing an identifier set corresponding to the second AS uncast connection in the second terminal; and adding the third identifier set to the identifier set corresponding to the second AS uncast connection in the second terminal.

Alternatively, acquiring the third identifier set includes: receiving a replay message sent from the first terminal in response to the connection establishment request; and acquiring the third identifier set carried in the replay message.

Alternatively, the method further includes deleting the fourth identifier set and AS configuration parameters corresponding to the fourth identifier set in response to interruption of the first AS unicast connection.

Alternatively, the method further includes deleting a destination sidelink identifier corresponding to a target sidelink unicast service at the second terminal side from the fourth identifier set in response to completion of the target sidelink unicast service; in which the target sidelink unicast service is any service of sidelink unicast services corresponding to the first AS uncast connection.

In conclusion, according to the technical solution provided in the embodiment of the present disclosure, the terminal may configure a set of destination sidelink identifiers for each established AS unicast connection and the destination sidelink identifiers in the set share a same set of AS configuration parameters. After the first terminal receives a request for establishing an AS unicast connection sent from the second terminal, the first terminal determines whether source sidelink identifiers used by the second terminal include a sidelink identifier existing in any set of destination sidelink identifiers stored locally, if yes, it indicates that the first terminal has established the AS unicast connection with the second terminal. In this case, the source sidelink identifiers used by the second terminal may be added to the corresponding set of destination sidelink identifiers, and the AS configuration parameters of the AS unicast connection already established may be reused, without reconfiguration. At the second terminal side, the same process can be performed based on the source sidelink identifiers used by the first terminal sent from the first terminal. In this way, an effect of saving signaling overhead between UEs via the sidelink communication can be achieved.

Figure 6:
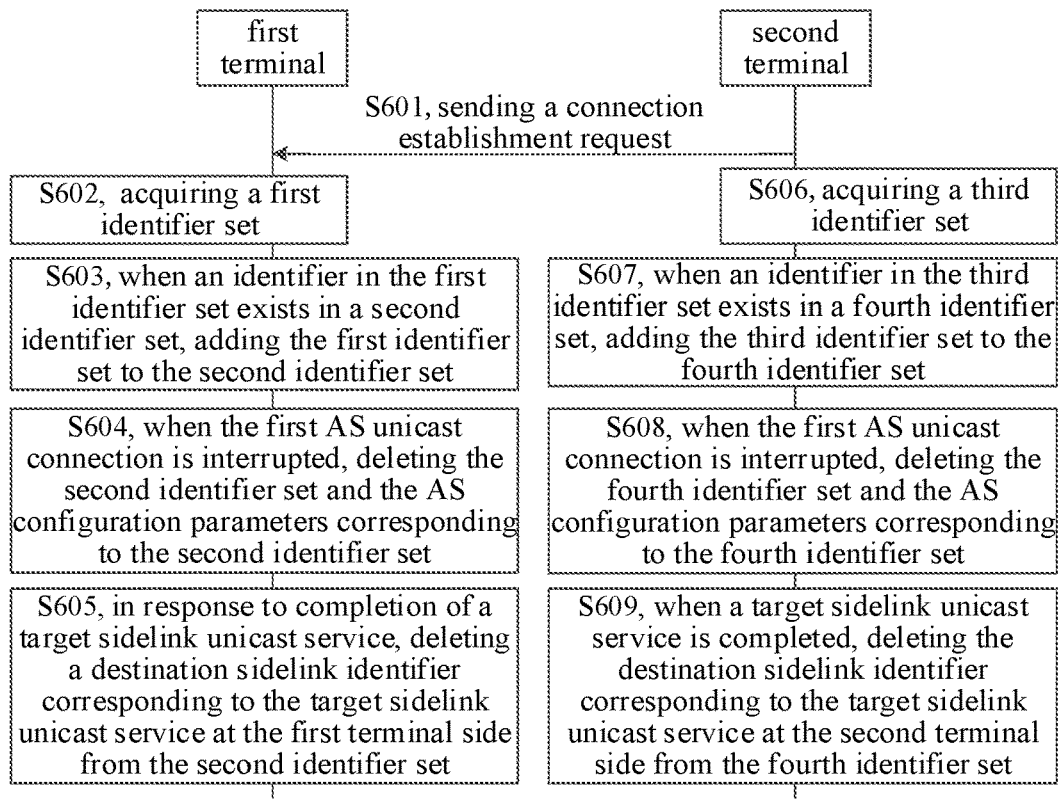
FIG. 6 is a flowchart of a method for establishing a unicast connection performed by first and second terminals, according to an embodiment.

Refer to FIG. 6, which is a flowchart of a method for establishing a unicast connection according to an embodiment. The method may be applied to the wireless communication system shown in FIG. 1, and performed by two terminals (a first terminal and a second terminal) in the wireless communication system. As illustrated in FIG. 6, the method may include the following.

In 601, the second terminal sends a connection establishment request to the first terminal, and the first terminal receives the connection establishment request.

The connection establishment request is configured to request establishment of an AS unicast connection for transmitting a sidelink unicast service between the first terminal and the second terminal.

In the embodiment, when the application layer of the second terminal needs to initiate a sidelink unicast service with the first terminal, the application layer sends a source sidelink identifier used by the second terminal for the sidelink unicast service and a destination sidelink identifier used by the second terminal for the sidelink unicast service to the AS layer, so as to trigger the AS layer to send the connection establishment request for establishing the AS unicast connection to the first terminal.

The source sidelink identifier used by the second terminal for the sidelink unicast service may also be a destination sidelink identifier used by the first terminal for the sidelink unicast service. Correspondingly, the destination sidelink identifier used by the second terminal for the sidelink unicast service may also be a source sidelink identifier used by the first terminal for the sidelink unicast service.

In 602, the first terminal acquires a first identifier set. The first identifier set is a set of source sidelink identifiers used by the second terminal.

In a possible implementation, the first terminal may acquire the first identifier set carried in the connection establishment request. That is, in 601, the second terminal sends the connection establishment request carrying the first identifier set to the first terminal.

In other words, in the embodiment, when the second terminal sends the connection establishment request to the first terminal, in addition to the source sidelink identifier used by the second terminal for the sidelink unicast service is sent to the first terminal via the connection establishment request, the source sidelink identifiers used by the second terminal for other sidelink unicast services are also sent to the first terminal via the connection establishment request.

In another possible implementation, the second terminal may send the first identifier set through a signaling other than the connection establishment request, correspondingly, the first terminal acquires the first identifier set through the signaling other than the connection establishment request.

For example, after sending the connection establishment request, the second terminal sends the first identifier set to the first terminal through another signaling, correspondingly, the first terminal receives the first identifier set through the subsequent signaling after receiving the connection establishment request.

In 603, when an identifier in the first identifier set exists in a second identifier set, the first terminal adds the first identifier set to the second identifier set.

The second identifier set is an identifier set corresponding to a first AS unicast connection in the first terminal, the first AS unicast connection is any connection of AS unicast connections established by the first terminal, the second identifier set is a set of destination sidelink identifiers corresponding to the first AS unicast connection at the first terminal side, and identifiers in an identifier set corresponding to an AS unicast connection use a same set of AS configuration parameters.

The first terminal configures one identifier set for each unicast connection already established. The identifier set corresponding to a unicast connection stores destination sidelink identifiers for sidelink unicast communication via the unicast connection. The identifier set corresponding to one unicast connection has a unique set of AS configuration parameters. The AS configuration parameters are shared by the destination sidelink identifiers in the corresponding identifier set.

In the embodiment, after acquiring the source sidelink identifiers used by the second terminal, if the first terminal detects that one of the source sidelink identifiers is the destination sidelink identifier corresponding to an already established unicast connection in the first terminal that exists at the first terminal side, it indicates that a sidelink unicast service has been transmitted between the first terminal and the second terminal, i.e., the AS unicast connection (the above mentioned first AS unicasts connection) has been established between the first terminal and the second terminal. In this case, the already established AS unicast connection between the two terminals may be used to transmit the unicast service of the new request, without establishing a new AS unicast connection between the two terminals. Correspondingly, the unicast service of the new request may reuse the unicast service corresponding to the already established AS unicast connection between the two terminals, and no more negotiation of the AS configuration parameters is required, thus saving signaling overhead generated by negotiating the AS configuration parameters between the two terminals.

In 604, when the first AS unicast connection is interrupted, the first terminal deletes the second identifier set and the AS configuration parameters corresponding to the second identifier set.

In the embodiment, since multiple destination sidelink identifiers (i.e., multiple sidelink unicast services between a pair of terminals) correspond to a single AS unicast connection, when the first AS unicast connection is interrupted, the multiple unicast services corresponding to the first AS unicast connection are interrupted, in this case, the first terminal may delete the second identifier set and the AS configuration parameters corresponding to the first AS unicast connection.

In 605, when a target sidelink unicast service is completed, the first terminal deletes a destination sidelink identifier corresponding to the target sidelink unicast service at the first terminal side from the second identifier set.

The target sidelink unicast service is any service of sidelink unicast services corresponding to the first AS unicast connection.

The destination sidelink identifier corresponding to target sidelink unicast service at the first terminal side is the destination sidelink identifier used by the first terminal for transmitting the target sidelink unicast service, and also is the source sidelink identifier used by the second terminal for transmitting the target sidelink unicast service.

In the embodiment, when one unicast service of multiple sidelink unicast services corresponding to an AS unicast connection already established by the first terminal is completed, and other sidelink unicast services of the multiple sidelink unicast services are not completed, the AS unicast connection and its AS configuration parameters may be used to transmit the other sidelink unicast services continually, and the destination sidelink identifier corresponding to the already completed sidelink unicast service in the first terminal is deleted by the first terminal from the identifier set corresponding to the AS unicast connection.

In 606, the second terminal acquires a third identifier set. The third identifier set is a set of source sidelink identifiers used by the first terminal.

In a possible implementation, the first terminal may send the third identifier set to the second terminal.

Alternatively, when sending the third identifier set, the first terminal may send a reply message carrying the third identifier set to the second terminal in response to the connection establishment request. Correspondingly, the second terminal receives the reply message sent by the first terminal in response to the connection establishment request and acquires the third identifier set carried in the reply message.

In 607, when an identifier in the third identifier set exists in a fourth identifier set, the second terminal adds the third identifier set to the fourth identifier set. The fourth identifier set is a set of destination sidelink identifiers corresponding to the first AS unicast connection at the second terminal side.

When an identifier in the third identifier set exists in the fourth identifier set, the above first AS unicast connection is also any connection of AS unicast connections already established by the second terminal.

With the technical solution of the embodiments of the present disclosure, an AS unicast connection is established between two terminals. The AS unicast connection may be used to perform multiple sidelink unicast services each corresponding to a source sidelink identifier and a destination sidelink identifier, and the multiple sidelink unicast services share a same set of AS configuration parameters. That is, when multiple sidelink unicast services are performed between two terminals, it is unnecessary to establish a new AS unicast connection and negotiate new AS configuration parameters for each sidelink unicast service, such that signaling overhead between the two terminals may be saved.

In 608, when the first AS unicast connection is interrupted, the second terminal deletes the fourth identifier set and the AS configuration parameters corresponding to the fourth identifier set.

The process that the second terminal deletes the fourth identifier set and the AS configuration parameters corresponding to the fourth identifier set is similar to the process that the first terminal deletes the second identifier set and the AS configuration parameters corresponding to the second identifier set described in 604, which is not elaborated here.

In 609, when a target sidelink unicast service is completed, the second terminal deletes the destination sidelink identifier corresponding to the target sidelink unicast service at the second terminal side from the fourth identifier set.

The target sidelink unicast service is any service of sidelink unicast services corresponding to the first AS unicast connection.

The destination sidelink identifier corresponding to the target sidelink unicast service at the second terminal side is the destination sidelink identifier used by the second terminal for transmitting the target sidelink unicast service, and is also the source sidelink identifier used by the first terminal for transmitting the target sidelink unicast service.

The process that the second terminal deletes the destination sidelink identifier corresponding to the target sidelink unicast service at the second terminal side is similar to the process that the first terminal deletes the destination sidelink identifier corresponding to the target sidelink unicast service at the first terminal side described in 604, which is not elaborated here.

Based on the technical solution of the embodiment of the present disclosure, in a possible example, a process of establishing a unicast connection between UE1 and UE2 can be described as follows.

1) UE1 has established an AS unicast connection which corresponds to a destination sidelink identifier list (000) and AS configuration parameters including a support to 64QAM and a short length of PDCP SN. The source sidelink identifiers used by UE1 are 100 and 101.

2) UE2 has established an AS unicast connection which corresponds to a destination sidelink identifier list (100) and AS configuration parameters including a support to 64QAM and a short length of PDCP SN. The source sidelink identifier used by UE2 in all unicast connections is 100.

3) The application layer of UE2 receives a service request for establishing a unicast connection with the destination sidelink identifier 101. With a source sidelink identifier 110, UE2 generates a sidelink connection establishment request, which carries all the sidelink identifiers of UE2 for unicast connections 110 and 000.

4) After receiving the connection establishment request sent from UE2, UE1 finds that the identifier 000 exits in the destination sidelink identifier list of the already established AS unicast connection, and sends a reply message carrying all the sidelink identifiers of UE1 for unicast connections 100 and 101. Further, UE1 adds the sidelink identifier 110 to the destination sidelink identifier list. Thereafter, data transmission corresponding to the sidelink identifier 110 uses the AS configuration parameters corresponding to the list and no negotiation of configuration parameters is initiated.

5) After receiving the reply message, UE2 adds the identifier 101 to the destination sidelink identifier list of the already established AS unicast connection. Thereafter, data transmission corresponding to the sidelink identifier 101 uses the AS configuration parameters corresponding to the list and no negotiation of configuration parameters is initiated.

In conclusion, according to the technical solution provided in the embodiment of the present disclosure, the terminal may configure a set of destination sidelink identifiers for each established AS unicast connection and the destination sidelink identifiers in the set share a same set of AS configuration parameters. After the first terminal receives a request for establishing an AS unicast connection sent from the second terminal, the first terminal determines whether source sidelink identifiers used by the second terminal include a sidelink identifier existing in any set of destination sidelink identifiers stored locally, if yes, it indicates that the first terminal has established the AS unicast connection with the second terminal. In this case, the source sidelink identifiers used by the second terminal may be added to the corresponding set of destination sidelink identifiers, and the AS configuration parameters of the AS unicast connection already established may be reused, without reconfiguration. At the second terminal side, the same process can be performed based on the source sidelink identifiers used by the first terminal sent from the first terminal. In this way, an effect of saving signaling overhead between UEs via the sidelink communication can be achieved.

Figure 7:
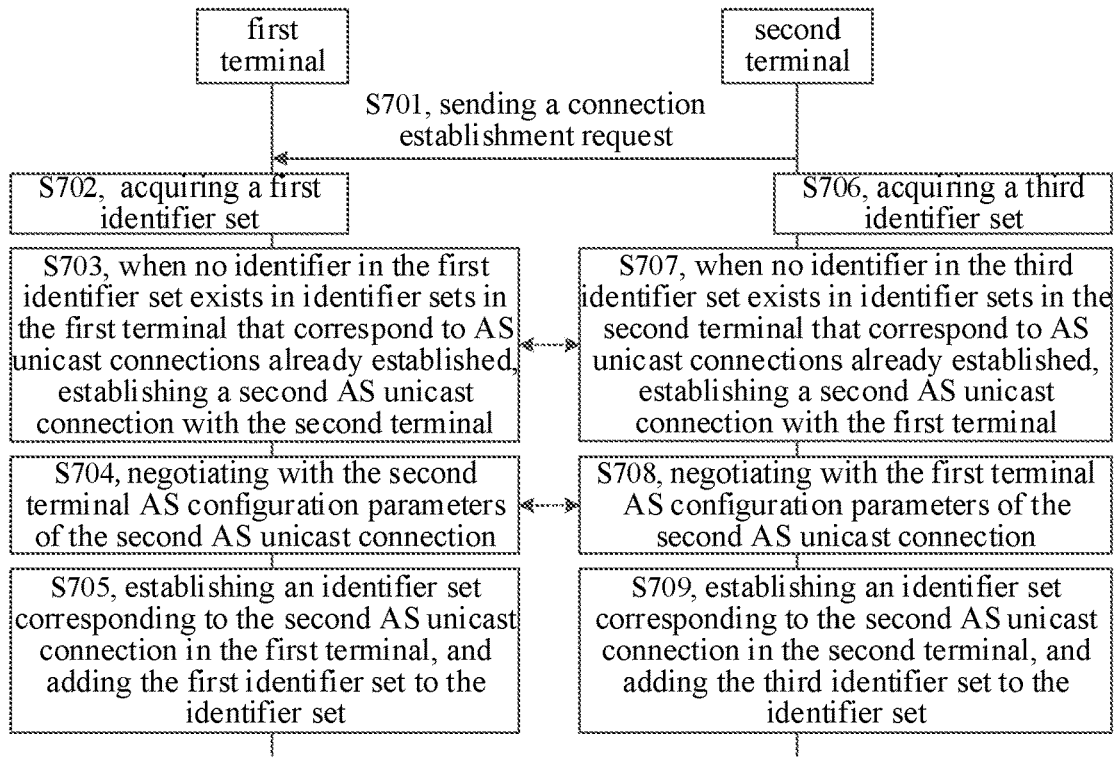
FIG. 7 is a flowchart of another method for establishing a unicast connection performed by first and second terminals, according to an embodiment.

Refer to FIG. 7, which is a flowchart of a method for establishing a unicast connection according to an embodiment. The method may be applied to the wireless communication system shown in FIG. 1, and performed by two terminals (a first terminal and a second terminal) in the wireless communication system. As illustrated in FIG. 7, the method may include the following.

In 701, the second terminal sends a connection establishment request to the first terminal, and the first terminal receives the connection establishment request.

In 702, the first terminal acquires a first identifier set. The first identifier set is a set of source sidelink identifiers used by the second terminal.

Regarding the execution of 701 and 702, reference can be made to the description about 601 and 602 in the embodiment described with referent to FIG. 6, which is not elaborated here.

In 703, when no identifier in the first identifier set exists in identifier sets in the first terminal that correspond to AS unicast connections already established by the first terminal, the first terminal establishes a second AS unicast connection with the second terminal.

The second AS unicast connection is an AS unicast connection between the first terminal and the second terminal.

In the embodiment, after acquiring the source sidelink identifiers used by the second terminal, if the first terminal detects that none of the source sidelink identifiers is a destination sidelink identifier at the first terminal side that corresponds to any unicast connection already established in the first terminal, it indicates that no sidelink unicast service is transmitted between the first terminal and the second terminal, i.e., no AS unicast connection is established between the first terminal and the second terminal. In this case, a new AS unicast connection can be established between the first terminal and the second terminal for transmitting the unicast service of the new request.

In 704, the first terminal and the second terminal negotiate AS configuration parameters of the second AS unicast connection.

Since a new AS unicast connection (i.e., the above second AS unicast connection) needs to be established between the first terminal and the second terminal, the first terminal and the second terminal need to negotiate the AS configuration parameters of the second AS unicast connection. Thereafter, during maintenance of the second AS unicast connection, when other sidelink unicast services need to be transmitted between the first terminal and the second terminal, the AS configuration parameters negotiated this time can be reused, without establishing a new AS unicast connection between the two terminals. Correspondingly, no negotiation of AS configuration parameters is required, such that signaling overhead between the two terminals for negotiating the AS configuration parameters may be saved.

In 705, the first terminal establishes an identifier set corresponding to the second AS unicast connection in the first terminal, and adds the first identifier set to the identifier set corresponding to the second AS unicast connection in the first terminal.

In the embodiment, when the second AS unicast connection is established, the first terminal needs to creates an identifier set in the first terminal for the new established second AS unicast connection, for storage of destination sidelink identifiers used by the first terminal when transmitting sidelink unicast services via the second AS unicast connection (i.e., source sidelink identifiers used by the second terminal when transmitting sidelink unicast services via the second AS unicast connection).

In 706, the second terminal acquires a third identifier set. The third identifier set is a set of source sidelink identifiers used by the first terminal.

Regarding the execution of 706, reference can be made to the description about 606 in the embodiment described with referent to FIG. 6, which is not elaborated here.

In 707, when no identifier in the third identifier set exists in identifier sets in the second terminal that correspond to AS unicast connections already established by the second terminal, the second terminal establishes a second AS unicast connection with the first terminal.

The second AS unicast connection is an AS unicast connection between the first terminal and the second terminal.

707 and 703 are executed synchronously to achieve establishment of the second AS unicast connection between the two terminals.

In 708, the second terminal and the first terminal negotiate AS configuration parameters of the second AS unicast connection.

708 and 704 are executed synchronously to achieve negotiation of the AS configuration parameters between the two terminals.

In 709, the second terminal establishes an identifier set corresponding to the second AS unicast connection in the second terminal, and adds the third identifier set to the identifier set corresponding to the second AS unicast connection in the second terminal.

In the embodiment, when the second AS unicast connection is established, the second terminal needs to creates an identifier set in the second terminal for the new established second AS unicast connection, for storage of destination sidelink identifiers used by the second terminal when transmitting sidelink unicast services via the second AS unicast connection (i.e., source sidelink identifiers used by the first terminal when transmitting sidelink unicast services via the second AS unicast connection).

In the embodiment, when the second AS unicast connection is interrupted, the first terminal and the second terminal each deletes the identifier set and the AS configuration parameters corresponding to the second AS unicast connection.

Additionally, when a target sidelink unicast service transmitted via the second AS unicast connection is completed, the first terminal and the second terminal each deletes the destination sidelink identifier corresponding to the target sidelink unicast service at each side from the identifier set corresponding to the second AS unicast connection.

Based on the technical solution of the embodiment of the present disclosure, in a possible example, a process of establishing a unicast connection between UE1 and UE2 can be described as follows.

1) UE1 has established an AS unicast connection which corresponds to a destination sidelink identifier list (000, 001) and AS configuration parameters including a support to 64QAM and a short length of PDCP SN. The source sidelink identifiers used by UE1 are 100 and 101.

2) UE2 has established an AS unicast connection which corresponds to a destination sidelink identifier list (010, 011) and AS configuration parameters including a support to 64QAM and a short length of PDCP SN. The source sidelink identifiers used by UE2 in all unicast connections are 110 and 111.

3) The application layer of UE2 receives a service request for establishing a unicast connection with the destination sidelink identifier 100. With a source sidelink identifier 110, UE2 generates a sidelink connection establishment request, which carries all the sidelink identifiers of UE2 for unicast connections 110 and 111.

4) After receiving the connection establishment request sent from UE2, UE1 finds that neither the identifier 110 nor the identifier 111 exits in any destination sidelink identifier list of the already established AS unicast connection, and sends a reply message carrying all the sidelink identifiers of UE1 for unicast connections 100 and 101. Further, a negotiation of configuration parameters is initiated.

5) After receiving the reply message, UE2 finds that neither the identifier 100 nor the identifier 101 exits in any destination sidelink identifier list of the already established AS unicast connection, then a negotiation of configuration parameters is initiated.

6) After the connection establishment, UE1 creates a new destination sidelink identifier list which includes 110 and 111, and corresponds to the AS configuration parameters negotiated during the connection establishment.

7) After the connection establishment, UE2 creates a new destination sidelink identifier list which includes 100 and 101, and corresponds to the AS configuration parameters negotiated during the connection establishment.

In conclusion, according to the technical solution provided in the embodiment of the present disclosure, the terminal may configure a set of destination sidelink identifiers for each established AS unicast connection and the destination sidelink identifiers in the set share a same set of AS configuration parameters. After the first terminal receives a request for establishing an AS unicast connection sent from the second terminal, the first terminal determines whether source sidelink identifiers used by the second terminal include a sidelink identifier existing in any set of destination sidelink identifiers stored locally, if no, it indicates that no AS unicast connection is established between the first terminal and the second terminal. In this case, a new AS unicast connection can be established and the AS configuration parameters can be negotiated between the two terminals, further the identifier set corresponding to the AS unicast connection is created for storage of destination sidelink identifiers used by the first terminal for transmitting sidelink unicast services via the second AS unicast connection. At the second terminal side, the same process can be performed based on the source sidelink identifiers used by the first terminal sent from the first terminal. Thereafter, when other sidelink unicast services need to be transmitted between the first terminal and the second terminal, the AS configuration parameters negotiated this time can be reused, without establishing a new AS unicast connection between the two terminals. Correspondingly, no more negotiation of the AS configuration parameters is required, thus saving signaling overhead generated by negotiating the AS configuration parameters between the two terminals.

Apparatus embodiments of the present disclosure will be described below, which may be used to implement the method embodiments of the present disclosure. Regarding details not described in the apparatus embodiments, reference can be made to the method embodiments.

Figure 8:
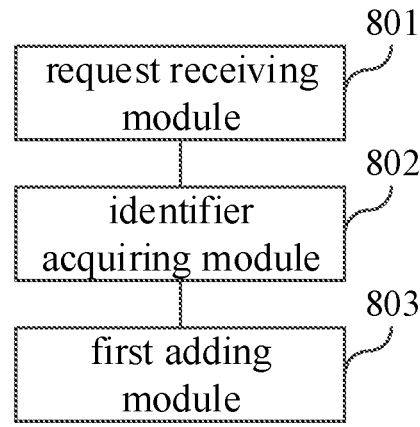
FIG. 8 is a block diagram of an apparatus for establishing a unicast connection using the method of FIG. 4, 6 or 7, according to an embodiment.

FIG. 8 is a block diagram of an apparatus for establishing a unicast connection according to an embodiment. As illustrated in FIG. 8, the apparatus may be implemented as a part or all of a terminal in the implementation environment shown in FIG. 1 through hardware or a combination of software and hardware, so as to perform operations executed by the first terminal in any of embodiments described with reference to FIG. 4, FIG. 6 and FIG. 7. The apparatus may include a request receiving module 801, an identifier acquiring module 802, and a first adding module 803.

The request receiving module 801 is configured to receive a connection establishment request sent from a second terminal. The connection establishment request is configured to request establishment of an access stratum (AS) unicast connection for transmitting a sidelink unicast service between the first terminal and the second terminal.

The identifier acquiring module 802 is configured to acquire a first identifier set carried in the connection establishment request. The first identifier set is a set of source sidelink identifiers used by the second terminal.

The first adding module 803 is configured to add the first identifier set to a second identifier set in response to that an identifier in the first identifier set exists in the second identifier set. The second identifier set is an identifier set corresponding to a first AS unicast connection in the first terminal, the first AS unicast connection is any connection of AS unicast connections established by the first terminal, the second identifier set is a set of destination sidelink identifiers corresponding to the first AS unicast connection at the first terminal side, and identifiers in an identifier set corresponding to an AS unicast connection use a same set of AS configuration parameters.

Alternatively, the apparatus further includes a connection establishing module and a parameter negotiating module.

The connection establishing module is configured to establish a second AS unicast connection with the second terminal in response to that no identifier of the first identifier set exists in identifier sets corresponding respectively to the AS unicast connections in the first terminal.

The parameter negotiating module is configured to negotiate with the second terminal AS configuration parameters of the second AS unicast connection.

Alternatively, the apparatus further includes an identifier set establishing module and a second adding module.

The identifier set establishing module is configured to establish an identifier set corresponding to the second AS uncast connection in the first terminal.

The a second adding module is configured to add the first identifier set to the identifier set corresponding to the second AS uncast connection in the first terminal.

Alternatively, the apparatus further includes an identifier sending module, configured to send a third identifier set to the second terminal, in which the third identifier set is a set of source sidelink identifiers used by the first terminal.

Alternatively, the identifier sending module is configured to send a reply message to the second terminal in response to the connection establishment request, in which the reply message carries the third identifier set.

Alternatively, the apparatus further includes a first deleting module, configured to delete the second identifier set and AS configuration parameters corresponding to the second identifier set in response to interruption of the first AS unicast connection.

Alternatively, the apparatus further includes a second deleting module, configured to delete a destination sidelink identifier corresponding to a target sidelink unicast service at the first terminal side from the second identifier set in response to completion of the target sidelink unicast service; in which the target sidelink unicast service is any service of sidelink unicast services corresponding to the first AS uncast connection.

Figure 9:
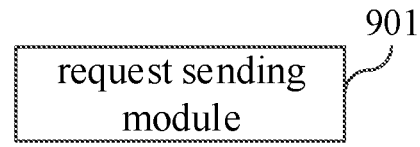
FIG. 9 is a block diagram of an apparatus for establishing a unicast connection using the method of FIG. 5, 6 or 7, according to an embodiment.

FIG. 9 is a block diagram of an apparatus for establishing a unicast connection according to an embodiment. As illustrated in FIG. 9, the apparatus may be implemented as a part or all of a terminal in the implementation environment shown in FIG. 1 through hardware or a combination of software and hardware, so as to perform operations executed by the second terminal in any of embodiments described with reference to FIG. 5, FIG. 6 and FIG. 7. The apparatus may include a request sending module 901.

The request sending module 901 is configured to send a connection establishment request carrying a first identifier set to a first terminal, in which the connection establishment request is configured to request establishment of an access stratum (AS) unicast connection for transmitting a sidelink unicast service between the first terminal and the second terminal.

The first identifier set is a set of source sidelink identifiers used by the second terminal.

Alternatively, the apparatus further includes an identifier acquiring module and a first adding module.

The identifier acquiring module is configured to acquire a third identifier set, wherein the third identifier set is a set of source sidelink identifiers used by the first terminal.

The first adding module is configured to add the third identifier set to a fourth identifier set in response to that an identifier in the third identifier set exists in the fourth identifier set, in which the fourth identifier set is a set of destination sidelink identifiers corresponding to a first AS unicast connection at the second terminal side, and the first AS unicast connection is any connection of AS unicast connections established by the second terminal.

Alternatively, the apparatus further includes a connection establishing module and a parameter negotiating module.

The connection establishing module is configured to establish a second AS unicast connection with the first terminal in response to that no identifier of the third identifier set exists in identifier sets corresponding respectively to the AS unicast connections in the second terminal. The second AS unicast connection is an AS unicast connection between the first terminal and the second terminal.

The parameter negotiating module is configured to negotiate with the first terminal AS configuration parameters of the second AS unicast connection.

Alternatively, the apparatus further includes an identifier set establishing module and a second adding module.

The identifier set establishing module is configured to establish an identifier set corresponding to the second AS uncast connection in the second terminal.

The second adding module is configured to add the third identifier set to the identifier set corresponding to the second AS uncast connection in the second terminal.

Alternatively, the identifier acquiring module is configured to: receive a replay message sent from the first terminal in response to the connection establishment request; and acquire the third identifier set carried in the replay message.

Alternatively, the apparatus further includes a first deleting module, configured to delete the fourth identifier set and AS configuration parameters corresponding to the fourth identifier set in response to interruption of the first AS unicast connection.

Alternatively, the apparatus further includes a second deleting module, configured to delete a destination sidelink identifier corresponding to a target sidelink unicast service at the second terminal side from the fourth identifier set in response to completion of the target sidelink unicast service.

The target sidelink unicast service is any service of sidelink unicast services corresponding to the first AS uncast connection.

An embodiment of the present disclosure further discloses an apparatus for establishing a unicast connection, which may be implemented as a part or all of a terminal in the system shown in FIG. 1, so as to perform some or all of operations executed by the first terminal in any of embodiments described with reference to FIG. 4, FIG. 6 and FIG. 7. The apparatus may include a processor and a memory configured to store instructions executable by the processor.

The processor is configured to: receive a connection establishment request sent from a second terminal, in which the connection establishment request is configured to request establishment of an access stratum (AS) unicast connection for transmitting a sidelink unicast service between the first terminal and the second terminal; acquire a first identifier set carried in the connection establishment request, in which the first identifier set is a set of source sidelink identifiers used by the second terminal; and add the first identifier set to a second identifier set in response to that an identifier in the first identifier set exists in the second identifier set, in which the second identifier set is an identifier set corresponding to a first AS unicast connection in the first terminal, the first AS unicast connection is any connection of AS unicast connections established by the first terminal, the second identifier set is a set of destination sidelink identifiers corresponding to the first AS unicast connection at the first terminal side, and identifiers in an identifier set corresponding to an AS unicast connection use a same set of AS configuration parameters.

Alternatively, the processor is further configured to establish a second AS unicast connection with the second terminal in response to that no identifier of the first identifier set exists in identifier sets corresponding respectively to the AS unicast connections in the first terminal; and negotiate with the second terminal AS configuration parameters of the second AS unicast connection.

Alternatively, the processor is further configured to establish an identifier set corresponding to the second AS uncast connection in the first terminal; and add the first identifier set to the identifier set corresponding to the second AS uncast connection in the first terminal.

Alternatively, the processor is further configured to send a third identifier set to the second terminal, in which the third identifier set is a set of source sidelink identifiers used by the first terminal.

Alternatively, sending the third identifier set to the second terminal includes: sending a reply message to the second terminal in response to the connection establishment request, in which the reply message carries the third identifier set.

Alternatively, the processor is further configured to delete the second identifier set and AS configuration parameters corresponding to the second identifier set in response to interruption of the first AS unicast connection.

Alternatively, the processor is further configured to delete a destination sidelink identifier corresponding to a target sidelink unicast service at the first terminal side from the second identifier set in response to completion of the target sidelink unicast service; in which the target sidelink unicast service is any service of sidelink unicast services corresponding to the first AS uncast connection.

An embodiment of the present disclosure further discloses an apparatus for establishing a unicast connection, which may be implemented as a part or all of a terminal in the system shown in FIG. 1, so as to perform some or all of operations executed by the second terminal in any of embodiments described with reference to FIG. 5, FIG. 6 and FIG. 7. The apparatus may include a processor and a memory configured to store instructions executable by the processor.

The processor is configured to: send a connection establishment request carrying a first identifier set to a first terminal, in which the connection establishment request is configured to request establishment of an access stratum (AS) unicast connection for transmitting a sidelink unicast service between the first terminal and the second terminal. The first identifier set is a set of source sidelink identifiers used by the second terminal.

Alternatively, the processor is further configured to acquire a third identifier set, in which the third identifier set is a set of source sidelink identifiers used by the first terminal; and add the third identifier set to a fourth identifier set in response to that an identifier in the third identifier set exists in the fourth identifier set, in which the fourth identifier set is a set of destination sidelink identifiers corresponding to a first AS unicast connection at the second terminal side, and the first AS unicast connection is any connection of AS unicast connections established by the second terminal.

Alternatively, the processor is further configured to establish a second AS unicast connection with the first terminal in response to that no identifier of the third identifier set exists in identifier sets corresponding respectively to the AS unicast connections in the second terminal, in which the second AS unicast connection is an AS unicast connection between the first terminal and the second terminal; and negotiate with the first terminal AS configuration parameters of the second AS unicast connection.

Alternatively, the processor is further configured to establish an identifier set corresponding to the second AS uncast connection in the second terminal; and add the third identifier set to the identifier set corresponding to the second AS uncast connection in the second terminal.

Alternatively, acquiring the third identifier set includes: receiving a replay message sent from the first terminal in response to the connection establishment request; and acquiring the third identifier set carried in the replay message.

Alternatively, the processor is further configured to delete the fourth identifier set and AS configuration parameters corresponding to the fourth identifier set in response to interruption of the first AS unicast connection.

Alternatively, the processor is further configured to delete a destination sidelink identifier corresponding to a target sidelink unicast service at the second terminal side from the fourth identifier set in response to completion of the target sidelink unicast service; in which the target sidelink unicast service is any service of sidelink unicast services corresponding to the first AS uncast connection.

The solution according to the embodiment of the present disclosure is described from the perspective of interaction between terminals. It should be understood that the terminal includes respective hardware structures and/or software modules for performing the above functions. In combination with the units and algorithm steps of the examples described in the embodiments disclosed in this specification, the embodiments of the present disclosure may be implemented by hardware, or a combination of hardware and computer software. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

Figure 10:
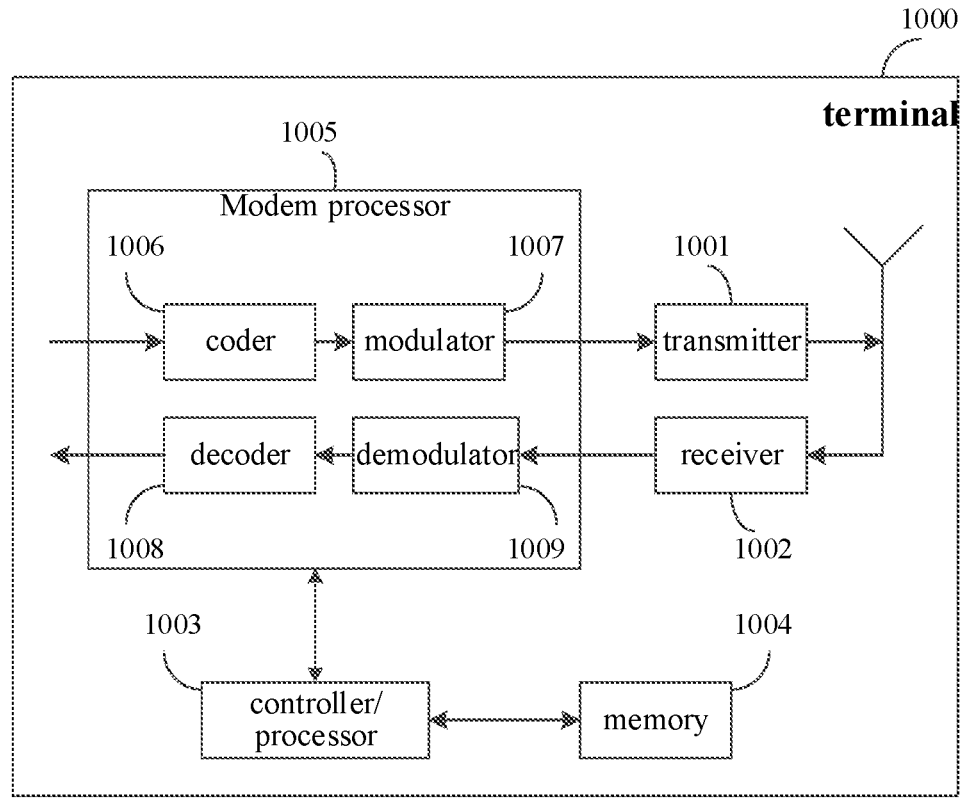
FIG. 10 is a block diagram of a terminal according to an embodiment.

FIG. 10 is a block diagram of a terminal according to an embodiment.

The terminal 1000 includes a transmitter 1001, a receiver 1002 and a processor 1003. The processor 1003 may be a controller, and is denoted as "controller/processor 1003" in FIG. 10. Alternatively, the terminal 1000 may further include a Modem processor 1005 which may include a coder 1006, a modulator 1007, a decoder 1008 and a demodulator 1009.

In an example, the transmitter 1001 performs adjustment (for example, analog conversion, filtering, amplification, up-conversion and so on) on an output sample and generates an uplink signal. The uplink signal is transmitted to the base station described above via the antenna. On the uplink, the antenna receives a downlink signal transmitted by the base station described above. The receiver 1002 performs adjustment (for example, filtering, amplification, down-conversion, digitalization and so on) on the signal received from the antenna and provides an input sample. In the Modem processor 1005, the coder 1006 receives business data and signaling messages to be sent on the uplink and processes the business data and signaling messages (for example, by normalizing, encoding and interweaving). The modulator 1007 further processes the encoded business data and signaling messages (for example by signal mapping and modulating) and provides an output sample. The demodulator 1009 processes the input sample (for example by demodulating) and provides a symbol estimation. The decoder 1008 processes the symbol estimation (for example, by de-interweaving and decoding) and provides decoded data and signaling messages to be sent to the terminal 1000. The coder 1006, the modulator 1007, the demodulator 1009 and the decoder 1008 may be implemented by the integrated Modem processor 1005. Those units perform operations based on the wireless access technology (for example, the access technology of LTE and other evolution systems) adopted by the wireless access network. It should be noted that, when the terminal 1000 does not include the Modem processor 1005, the above functions of the Modem processor 1005 may be also implemented by the processor 1003.

The processor 1003 is configured to control and manage actions of the terminal 1000, to perform processing procedures conducted by the terminal 1000 described in the foregoing embodiments. For example, the processor 1003 is further configured to perform respective steps at the terminal side described in the foregoing embodiments, and/or other steps of the technical solutions described in the embodiments of the present disclosure.

Further, the terminal 1000 may further include a memory 1004 configured to store program codes and data of the terminal 1000.

It should be understood that FIG. 10 merely shows a simplified design of the terminal 1000. In actual applications, the terminal 1000 may include any number of transmitters, receivers, processors, Modem processors, memories and so on, and any terminal which may implement the embodiment of the present disclosure falls into the scope of the embodiment of the present disclosure.

Those skilled in the art should be aware that, in one or more of the foregoing examples, the functions described in the embodiments of the disclosure may be implemented by hardware, software, firmware, or any combination thereof. When implemented by software, these functions can be stored in a computer-readable medium or transmitted as one or more instructions or codes on the computer-readable medium. The computer-readable medium includes a computer storage medium and a communication medium. The communication medium includes any medium that facilitates the transfer of a computer program from one place to another. The storage medium may be any available medium that can be accessed by a general or dedicated computer.

Embodiments of the present disclosure further provide a computer storage medium for storing computer software instructions used by the above first device, which include the programs designed for performing the above method for establishing a unicast connection.

It should be understood that, as used herein, "a plurality of" means two or more than two, unless specified otherwise. The term "and/or" represents an association relation between associated listed items, containing three association relations. For example, A and/or B is satisfied by any one of the following: A exists separately, B exists separately, and both A and B exist. The symbol "/" generally represents a relation of "or" between the associated listed items.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings and that various modifications and changes can be made without departing from the scope thereof. It is intended that the scope of the invention only be limited by the appended claims.

What is claimed is:

1. A method for establishing a unicast connection, performed by a first terminal, and comprising:
receiving a connection establishment request sent from a second terminal, wherein the connection establishment request is configured to request establishment of an access stratum (AS) unicast connection for transmitting a sidelink unicast service between the first terminal and the second terminal;
acquiring a first identifier set carried in the connection establishment request, wherein the first identifier set is a set of source sidelink identifiers used by the second terminal; and adding the first identifier set to a second identifier set in response to that an identifier in the first identifier set exists in the second identifier set, wherein the second identifier set is an identifier set corresponding to a first AS unicast connection in the first terminal and comprises destination sidelink identifiers corresponding to the first AS unicast connection at the first terminal side, the first AS unicast connection is any connection of AS unicast connections established by the first terminal, and identifiers in one identifier set corresponding to one AS unicast connection use a same set of AS configuration parameters.

2. The method according to claim 1, further comprising:
establishing a second AS unicast connection with the second terminal in response to that no identifier of the first identifier set exists in identifier sets corresponding respectively to the AS unicast connections in the first terminal; and
negotiating, by the first terminal and the second terminal, AS configuration parameters of the second AS unicast connection.

3. The method according to claim 2, further comprising:
establishing an identifier set corresponding to the second AS uncast connection in the first terminal; and
adding the first identifier set to the identifier set corresponding to the second AS uncast connection in the first terminal.

4. The method according to claim 1, further comprising:
sending a third identifier set to the second terminal, wherein the third identifier set is a set of source sidelink identifiers used by the first terminal.

5. The method according to claim 4, wherein sending the third identifier set to the second terminal comprises:
sending a reply message to the second terminal in response to the connection establishment request, wherein the reply message carries the third identifier set.

6. The method according to claim 1, further comprising:
deleting the second identifier set and AS configuration parameters corresponding to the second identifier set in response to interruption of the first AS unicast connection.

7. The method according to claim 1, further comprising:
deleting a destination sidelink identifier corresponding to a target sidelink unicast service at the first terminal side from the second identifier set in response to completion of the target sidelink unicast service;
wherein the target sidelink unicast service is any service of sidelink unicast services corresponding to the first AS uncast connection.

8. A method for establishing a unicast connection, performed by a second terminal, and comprising:
sending a connection establishment request carrying a first identifier set to a first terminal, wherein the connection establishment request is configured to request establishment of an access stratum (AS) unicast connection for transmitting a sidelink unicast service between the first terminal and the second terminal;
wherein the first identifier set is a set of source sidelink identifiers used by the second terminal;
wherein the first identifier set is used for the first terminal to add the first identifier set to a second identifier set in response to an identifier in the first identifier set existing in the second identifier set,
wherein the second identifier set is an identifier set corresponding to a first AS unicast connection in the first terminal and comprises destination sidelink identifiers corresponding to the first AS unicast connection at the first terminal side, the first AS unicast connection is any connection of AS unicast connections established by the first terminal, and identifiers in one identifier set corresponding to one AS unicast connection use a same set of AS configuration parameters.

9. The method according to claim 8, further comprising:
acquiring a third identifier set, wherein the third identifier set is a set of source sidelink identifiers used by the first terminal; and
adding the third identifier set to a fourth identifier set in response to that an identifier in the third identifier set exists in the fourth identifier set, wherein the fourth identifier set is a set of destination sidelink identifiers corresponding to a first AS unicast connection at the second terminal side, and the first AS unicast connection is any connection of AS unicast connections established by the second terminal.

10. The method according to claim 9, further comprising:
establishing a second AS unicast connection with the first terminal in response to that no identifier of the third identifier set exists in identifier sets corresponding respectively to the AS unicast connections in the second terminal; and
negotiating, by the first terminal and the second terminal, AS configuration parameters of the second AS unicast connection.

11. The method according to claim 10, further comprising:
establishing an identifier set corresponding to the second AS uncast connection in the second terminal; and
adding the third identifier set to the identifier set corresponding to the second AS uncast connection in the second terminal.

12. The method according to claim 9, wherein acquiring the third identifier set comprises:
receiving a replay message sent from the first terminal in response to the connection establishment request; and
acquiring the third identifier set carried in the replay message.

13. The method according to claim 9, further comprising:
deleting the fourth identifier set and AS configuration parameters corresponding to the fourth identifier set in response to interruption of the first AS unicast connection.

14. The method according to claim 9, further comprising:
deleting a destination sidelink identifier corresponding to a target sidelink unicast service at the second terminal side from the fourth identifier set in response to completion of the target sidelink unicast service;
wherein the target sidelink unicast service is any service of sidelink unicast services corresponding to the first AS uncast connection.

15. An apparatus for establishing a unicast connection, applicable in a first terminal, and comprising:
a processor;
a memory configured to store instructions executable by the processor; wherein,
the processor is configured to:
receive a connection establishment request sent from a second terminal, wherein the connection establishment request is configured to request establishment of an access stratum (AS) unicast connection for transmitting a sidelink unicast service between the first terminal and the second terminal;

acquire a first identifier set carried in the connection establishment request, wherein the first identifier set is a set of source sidelink identifiers used by the second terminal; and add the first identifier set to a second identifier set in response to that an identifier in the first identifier set exists in the second identifier set, wherein the second identifier set is an identifier set corresponding to a first AS unicast connection in the first terminal and comprises destination sidelink identifiers corresponding to the first AS unicast connection at the first terminal side, the first AS unicast connection is any connection of AS unicast connections established by the first terminal, and identifiers in one identifier set corresponding to one AS unicast connection use a same set of AS configuration parameters.

16. The apparatus according to claim 15, wherein the processor is further configured to:

establish a second AS unicast connection with the second terminal in response to that no identifier of the first identifier set exists in identifier sets corresponding respectively to the AS unicast connections in the first terminal; and negotiate with the second terminal AS configuration parameters of the second AS unicast connection.

17. The apparatus according to claim 16, wherein the processor is further configured to:

establish an identifier set corresponding to the second AS uncast connection in the first terminal; and add the first identifier set to the identifier set corresponding to the second AS uncast connection in the first terminal.

18. The apparatus according to claim 15, wherein the processor is further configured to:

send a third identifier set to the second terminal, wherein the third identifier set is a set of source sidelink identifiers used by the first terminal.

19. The apparatus according to claim 18, wherein the processor is further configured to send the third identifier set to the second terminal by:

sending a reply message to the second terminal in response to the connection establishment request, wherein the reply message carries the third identifier set.

20. An apparatus for establishing a unicast connection, applicable in a second terminal, and comprising:

a processor;

a memory configured to store instructions executable by the processor; wherein, the processor is configured to perform the method for establishing a unicast connection according to claim 8.

* * * * *